United States Patent
Eisenbraun

(10) Patent No.: US 9,533,647 B2
(45) Date of Patent: Jan. 3, 2017

(54) SEAT FOR A MOTOR VEHICLE

(71) Applicant: GM GLOBAL TECHNOLOGY OPERATIONS LLC, Detroit, MI (US)

(72) Inventor: Jonas Eisenbraun, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/742,049

(22) Filed: Jun. 17, 2015

(65) Prior Publication Data

US 2015/0360596 A1   Dec. 17, 2015

(30) Foreign Application Priority Data

Jun. 17, 2014   (DE) .................. 10 2014 008 818

(51) Int. Cl.
*B60R 21/207* (2006.01)
*B60N 2/44* (2006.01)
*B60N 2/68* (2006.01)

(52) U.S. Cl.
CPC ............ *B60R 21/207* (2013.01); *B60N 2/449* (2013.01); *B60N 2/4492* (2015.04); *B60N 2/682* (2013.01)

(58) Field of Classification Search
CPC ..... B60R 21/207; B60N 2/682; B60N 2/4492; B60N 2/449
USPC .......................................... 296/64
See application file for complete search history.

(56) References Cited

U.S. PATENT DOCUMENTS

| | | |
|---|---|---|
| 4,869,551 A | 9/1989 | Lathers |
| 5,681,080 A | 10/1997 | Pond et al. |
| 6,609,757 B2 | 8/2003 | Ott et al. |
| 7,758,115 B2 | 7/2010 | Yamaguchi et al. |
| 8,052,209 B2 * | 11/2011 | Bostrom .................. A62B 9/04 224/275 |
| 2010/0314920 A1 | 12/2010 | Arata et al. |

FOREIGN PATENT DOCUMENTS

| | | |
|---|---|---|
| DE | 68904114 T2 | 5/1993 |
| DE | 19910082 C1 | 4/2000 |
| DE | 102006037521 A1 | 5/2007 |
| DE | 202007000484 U1 | 5/2008 |
| DE | 102007050092 A1 | 4/2009 |
| DE | 102008026822 A1 | 12/2009 |
| DE | 102008038851 A1 | 2/2010 |
| DE | 102008060486 A1 | 6/2010 |
| DE | 202012008758 U1 | 10/2012 |
| EP | 0229737 A2 | 7/1987 |
| JP | H09104273 A | 4/1997 |
| JP | 2006082771 A | 3/2006 |
| KR | 20130063909 A | 6/2013 |

OTHER PUBLICATIONS

German Patent Office, German Search Report for German Application No. 102014008818.9, dated Apr. 14, 2015.

* cited by examiner

*Primary Examiner* — Pinel Romain

(74) *Attorney, Agent, or Firm* — Lorenz & Kopf LLP

(57) ABSTRACT

A seat for a motor vehicle includes a seat bottom having a seat cover, an upholstery and a support structure, and a seat back having a seat cover, an upholstery and a support structure. Two lateral support parts are fastened to a front section of the support structure of the seat back for increasing the lateral support of an occupant on the seat. The lateral support parts are fastened to the support structure of the seat back.

16 Claims, 4 Drawing Sheets

SEAT FOR A MOTOR VEHICLE

CROSS-REFERENCE TO RELATED APPLICATION

This application claims priority to German Patent Application No. 102014008818.9, filed Jun. 17, 2014, which is incorporated herein by reference in its entirety.

TECHNICAL FIELD

The present disclosure pertains to a seat for a motor vehicle and a motor vehicle.

BACKGROUND

Motor vehicles include a body defining an interior occupant compartment and seats arranged within the interior. Front seats include a seat part or seat bottom and a back part or seat back. The seat back can be pivoted around a swivel axis. Rear seats are arranged behind the front seats within the interior of the motor vehicle. The seat back of the front seats includes a support structure, which is fastened to or rests against an upholstery and a seat cover. In order to increase the lateral support far the seats, in particular for the front seats, lateral support parts in the form of a U-shaped frame or U-shaped strut made out of metal can be fastened to the support structure of the seat back by means of a welded joint. Such lateral support parts fastened to the support structure, in particular to vertical struts of the support structure of the seat back, increase the lateral support for individuals on the seat during cornering maneuvers and exposure to resultant lateral accelerations. Seats, in particular front seats, with the additional lateral support parts, are also referred to as sports seats. The vertical struts and U-shaped lateral support parts are joined together by means of a welded joint. A larger opening is present between the bracket- or U-shaped lateral support parts and the vertical struts of the support structure of the seat back. In the process of manufacturing the seat, the lateral support parts made out of metal are to be joined with seat by means of a welded joint in an initial phase of the manufacturing process. Seats with and without lateral support parts are here fabricated. Because the lateral support parts are already fastened by means of the welded joint in the initial phase of manufacturing the seat, an expensive warehousing of the seats both with and without lateral support parts is required, thereby increasing the costs for manufacturing the seats. Manufacturing the lateral support parts as U-shaped struts made out of metal is expensive, and the welded joint is also cost-intensive to fabricate.

SUMMARY

In accordance with the present disclosure, a motor vehicle, and more specifically a seat for a motor vehicle is provided in which the lateral support part can be fastened to the seat only in the end phase of the production process while manufacturing the seat, and the lateral support part can be inexpensively fabricated, as well as fastened to the support structure of the seat back at a low technical outlay.

The seat for a motor vehicle includes a seat bottom with a seat cover, an upholstery and a support structure. The seat also includes a seat back with a seat cover, an upholstery and a support structure, and two lateral support parts fastened to a front section of the support structure of the seat back for increasing the lateral support for a person on the seat. The lateral support parts are fastened, either positively or non-positively, to the support structure of the seat back. The lateral support parts are fastened, positively and/or non-positively, to the support structure of the seat back without a welded joint, so that the lateral support parts are only fastened to the support structure during an end phase of manufacturing the seat. As a result, seats both with and without lateral support parts only require brief warehousing while manufacturing the seats, thereby significantly reducing the costs for manufacturing the seats. In addition, the bond, whether positive and/or non-positive, can be established in an especially simple and inexpensive as well as reliable manner, thereby once again further advantageously reducing the costs of manufacturing the seat with the lateral support parts.

In particular, the lateral support parts are at least partially, and preferably completely, fabricated from a plastic material such as thermoplastic material, and the support structure of the seat back to which the lateral support parts are fastened are at least partially, and preferably completely, fabricated of metal, such as steel or aluminum. No substance-to-substance connection, in particular no welded joint, exists between the lateral support parts and the support structure of the seat back. Rather the lateral support parts are joined with the support structure of the seat back by means of a detachable connection. The lateral support parts made out of plastic, in particular thermoplastic material are especially easy to fabricate via injection molding, which makes them especially inexpensive to manufacture.

In another embodiment, the lateral support parts are essentially plate-shaped in design. Because the lateral support parts are essentially plate-shaped, the lateral supports include a large contact surface for bearing the upholstery and/or seat cover, so that the lateral support parts on the seat increase the lateral support in an especially comfortable manner.

In a supplementary embodiment, the lateral support parts each includes at least one mounting hole, and preferably several mounting holes, and a fastening element, for example a screw or rivet, which is arranged in the at least one mounting hole, and fixed on the support structure of the seat back, so that the fastening elements secure the lateral support parts to the support structure of the seat back. As a consequence, the fastening elements can be used to join the lateral support parts with the support structure or fasten them thereto in an especially reliable manner without any expensive welded joint during the end phase of manufacturing the seat. The connection between the lateral support parts and the support structure of the seat back can further be detached, so that a lateral support part that has already been fastened to the support structure of the seat back can also be detached therefrom again in an advantageous manner.

It is advantageous for a respective cover flap to be formed on the lateral support parts, which can pivot around a swivel axis by means of a hinge, and for the fastening elements to be covered by the cover flap in a closed pivot position. The fastening elements generally include sharp edges, and are thus not suitable as a support surface for the seat cover and/or upholstery. The fastening elements are covered by the cover flap in the closed pivot position, as a result of which the seat cover and/or upholstery has no contact with the fastening elements.

In one variant, the hinge is designed as a film or living hinge and/or the cover flap is designed as a respective single piece with the remaining lateral support part. As a result, the cover flap can be fabricated especially easily as a single piece including the living hinge via injection molding, and the cover plate can be inexpensively manufactured.

It is best for the lateral support parts to each include a support surface for the upholstery and/or seat cover. The support surface is used for the indirect or indirect placement of the upholstery and/or seat cover. Given the large support surface made available by the lateral support part with a horizontal extension in the longitudinal direction of the motor vehicle, this makes it possible to increase the lateral support for individuals on the seat.

In another embodiment, the cover flap partially forms the support surface in the closed pivot position. As a consequence, the support surface for the upholstery and/or seat cover is formed both in part by the lateral support part without the cover flap and in part by the cover plate itself.

In particular, a recess is formed on the support structure of the seat back for each respective lateral support part, and a projection or end section of the lateral support part is arranged in the recess, so that each respective lateral support part is positively fastened in the recess of the support structure of the seat back. The projection or end section of the lateral support part is preferably spaced apart from the fastening elements and/or mounting hole, so that the lateral support part is also reliably fastened to the support structure of the seat back for absorbing the larger forces acting on the support surface. In another embodiment, the recess is designed as a groove, and the projection or end section as a strip.

In a supplemental variant, the lateral support parts each include a mounting surface, and the mounting surfaces each lie on a respective counter-mounting surface of the support structure of the seat back. The mounting surfaces are at least partially designed complementarily to the counter-mounting surfaces. The mounting surface on each respective lateral support part can also be divided into partial mounting surfaces. The counter-mounting surface for each respective lateral support part on the support structure can also be divided into partial counter-mounting surfaces. As a result of the complementary design of the mounting surface and counter-mounting surface, which lie one on top of the other, along with a compressive force acting between the mounting surface and counter-mounting surface, each respective lateral support surface can additionally be positively fastened to the support structure of the seat back, or is fastened thereto. A compressive force acting between the mounting surface and counter-mounting surface causes the lateral support part to become non-positively fastened to the support structure of the seat back. In particular, the compressive force is applied to the lateral support part and support structure by the fastening elements. In another variant, the lateral support parts each include a fastening geometry, in particular a blind hole or clearance hole for fixing the inflatable lateral support airbag in place.

In a supplementary embodiment, the support structure of the seat back includes two essentially vertically aligned struts and an essentially horizontally aligned strut, and a lateral support part is fastened to each of the essentially vertically aligned struts. In the case of the struts, essentially vertically aligned means that the latter are aligned with a deviation of less than 45°, 30°, 20° or 10° relative to a vertical line. When pivoting the seat back, the vertically aligned struts are correspondingly pivoted as well.

In an additional embodiment, the extension of the lateral support parts in a horizontal longitudinal direction of the motor vehicle measures at least 10%, 30%, 50% or 70% of the extension of the support structure of the seat back with the lateral support part, in particular the essentially vertically aligned struts, in the horizontal longitudinal direction of the motor vehicle. Given the large extension of the lateral support part in the horizontal longitudinal direction of the motor vehicle, and hence also the support surface of the lateral support surface, the lateral support parts can be used to significantly increase the lateral support for individuals on the seat during cornering maneuvers of the motor vehicle with high encountered lateral accelerations.

In another embodiment, an inflatable lateral support airbag is fixed to the lateral support part by means of the fastening geometry. The lateral support airbag can be inflated with an air conveying device, e.g., an air pump or a compressor, thereby making it possible to increase the lateral support on the seat. Releasing air from the lateral support airbag reduces the volume of the lateral support airbag, and thus also reduces the lateral support on the seat. Blowing air into the lateral support airbag increases the volume of the lateral support airbag, and thus also increases the lateral support on the seat.

Motor vehicle according to the present disclosure includes a body, a drivetrain having an internal combustion engine and/or an electric engine, and at least one seat, wherein the seat is formed as a seat as summarized above.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
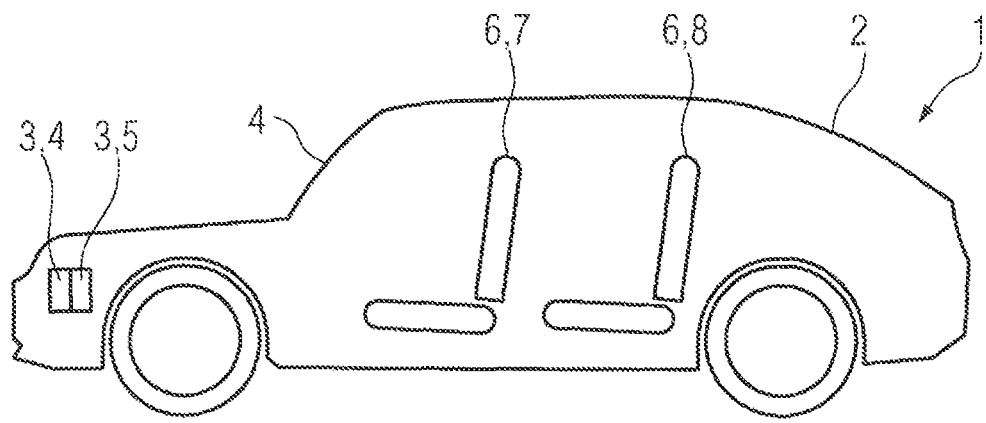
FIG. 1 is a side view of a motor vehicle.

A motor vehicle 1 shown on FIG. 1 includes a body 2 made out of metal, in particular steel. The motor vehicle 1 is moved by a drivetrain 3, including for example an electric engine 4 and/or an internal combustion engine 5. The body 2 encloses an interior, and the interior has arranged within it two front seats 7 as seats 6, as well as three rear seats 8 as seats 6. The three rear seats 8 are here combined into a single bench.

Figure 2:
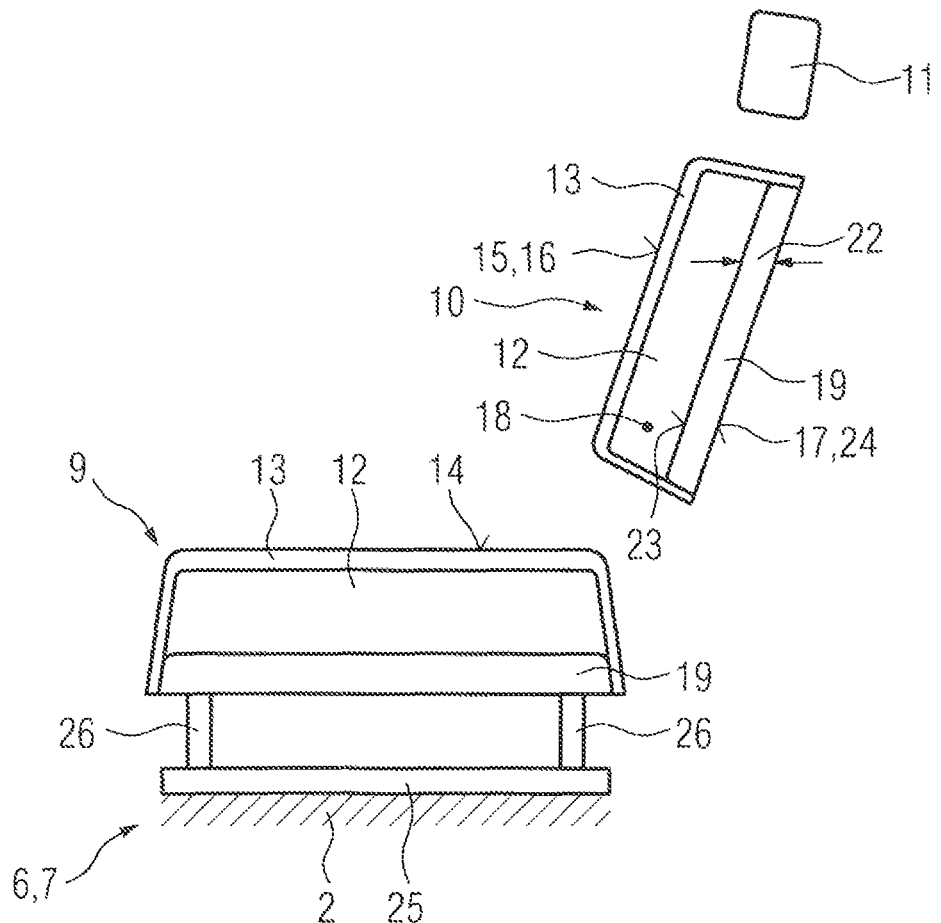
FIG. 2 is a longitudinal section of a front seat of the motor vehicle.

FIG. 2 presents a longitudinal section through the front seat 7. The front seat 7 includes a seat part or seat bottom 9 and a back part or seat back 10. The seat bottom 9 and seat back 10 each include a support structure 19, to which an upholstery 12 and a seat cover 13 are fastened. A headrest 11 is also fastened to the seat back 10. The seat bottom 9 is fastened to a rail 25 by means of support feet 26, and the rail 25 is fastened to the body 2. The support feet 26 fastened to the rail 25 can here be used to move (generally horizontal) the entire front seat 7 in the longitudinal direction of the motor vehicle 1. The support structure 19 of the seat back 10 is joined with the support structure 19 of the seat bottom 9 by means of connecting parts that are not shown, so that both the seat bottom 9 and seat back 10 also move together horizontally during the horizontal movement of the front seat 7.

The seat bottom 9 of the front seat 7 includes a seat surface 14 for an occupant to sit on, and the seat back 10 of the front seat 7 as a seat 6 includes a back surface 15 against which to rest the back of the occupant on the seat 6. The back surface 15 simultaneously forms a front side 16 of the seat back 10. The seat back 10 also includes a back side 17 opposite the front side 16. The seat back 10 is pivoted around a swivel axis 18 relative to the remaining motor vehicle 1, as well as to the seat bottom 9.

Figure 3:
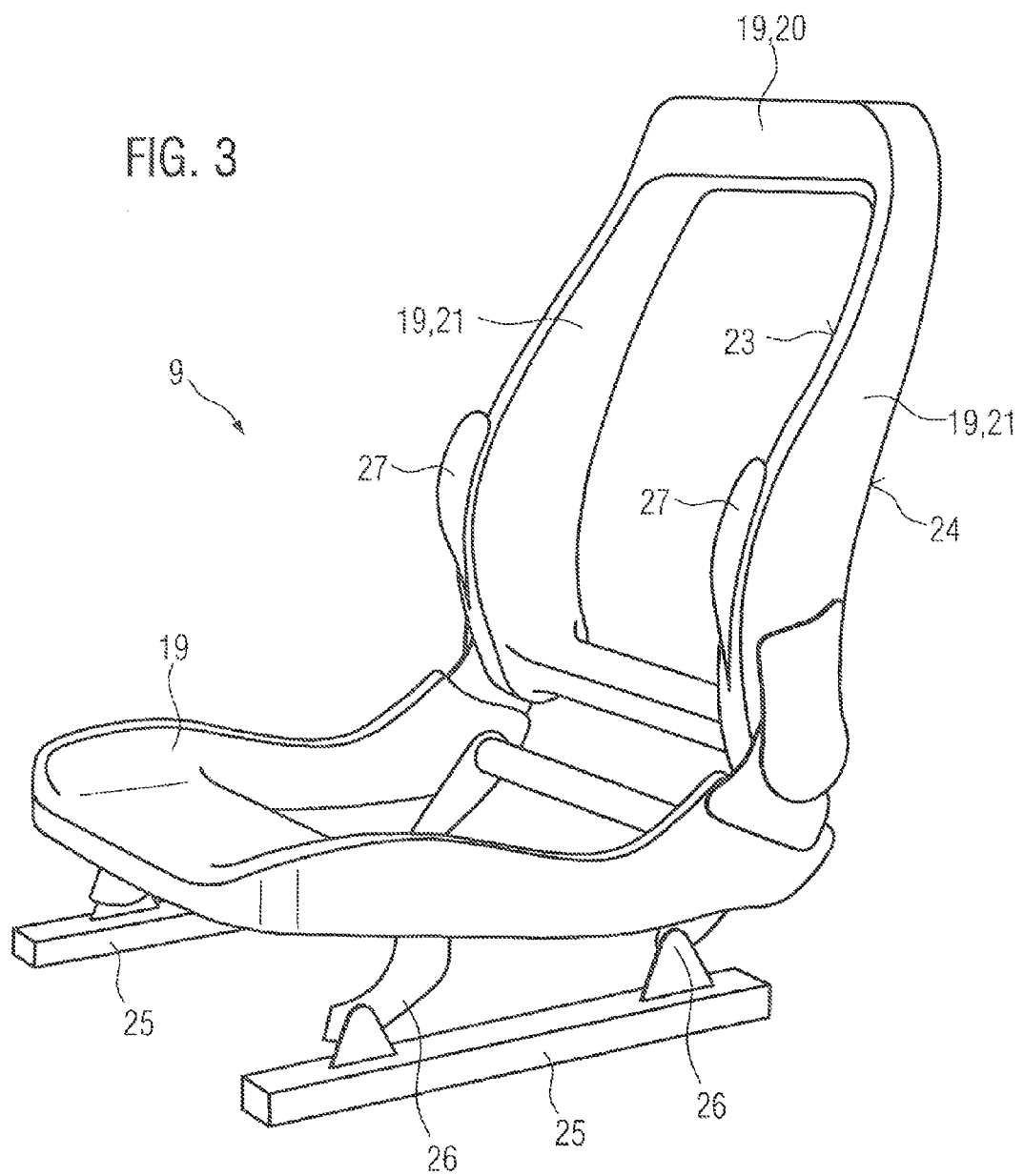
FIG. 3 is a perspective view of essentially only the support structure of the front seat with two lateral support parts.

The support structure 19 of the seat back 10 includes a horizontal strut 20 and two essentially vertically aligned struts 21 (FIG. 3). The struts 20, 21 consist of metal, in particular steel or aluminum, and may be pivoted around the swivel axis 18. The struts 21, and hence also the support structure 19 of the seat back 10, includes a front section 23 and a rear section 24. The front section 23 accommodates the upholstery 12. A lateral support part 27 is fastened to each of the vertical struts 21 on the front section 23. The lateral support part 27 includes a support surface 38, on which rest the upholstery 12 and possibly the seat cover 13. As a result, the lateral support parts 27 can significantly increase the lateral support for individuals on the seat 6 during fast cornering maneuvers and resultant lateral accelerations, since the support surface 38 provides additional lateral support on the sides of the seat 6.

The lateral support part 27 is fastened to the struts 21 by means of a detachable positive and non-positive bond. The lateral support part 27 is made out of thermoplastic material as a single piece, and also includes a cover flap 35. The cover flap 35 is mounted by means of a hinge 33 as a film or living hinge 34 so that it can pivot around a swivel axis relative to the remaining lateral support part 27. Two mounting holes 28 are formed on the lateral support part 27. Also formed on the lateral support part 27 is a strip 43 as a single piece with the remaining lateral support part 27, wherein the strip 43 here forms a projection 41 or an end section 42 of the plate-shaped lateral support part 27. A groove 40 is also formed as a recess 39 on the vertical struts 21. While assembling the seat 6, a mounting surface 44 lying opposite the support surface 38 on the plate-shaped lateral support part 27 is placed on a counter-mounting surface 45 of the vertical struts 21 made out of metal. The counter-mounting surface 45 includes part of the outer surface of the vertical struts 21. The mounting surfaces 44 and counter-mounting surfaces 45 are here designed complementarily to each other. A nib 46 is formed on the mounting surface 44 and a recess is formed on the counter-mounting surface 45 for this purpose. As a consequence, the nib 46 on the mounting surface 44 and the recess 47 on the counter-mounting surface 45 of the vertical strut 21 also brings about a positive bond between the lateral support part 27 and the vertical strut 21.

Figures 4, 5:
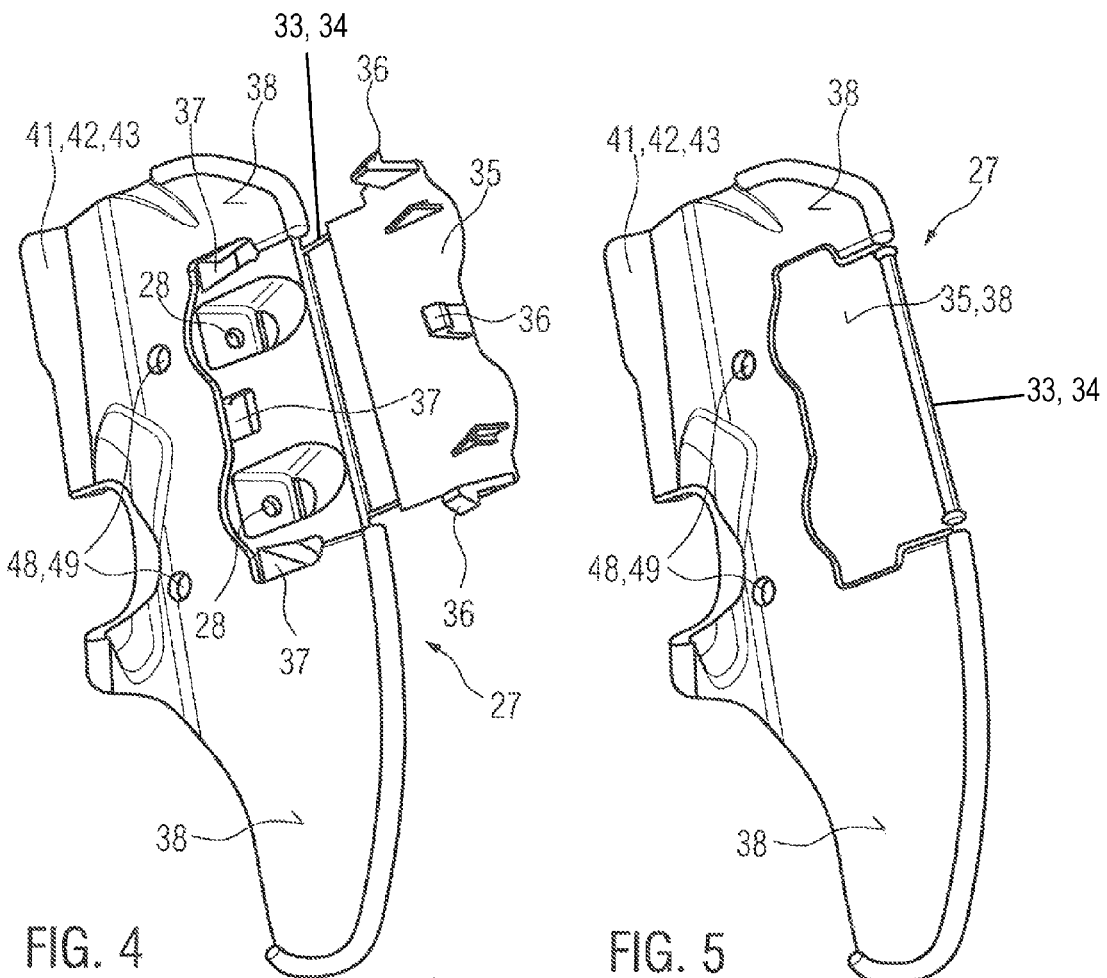
FIG. 4 is a view of a lateral support part according to FIG. 3 with a cover flap in an open pivot position.
FIG. 5 is a view of a lateral support part according to FIG. 3 with a cover flap in a closed pivot position.
Figure 6:
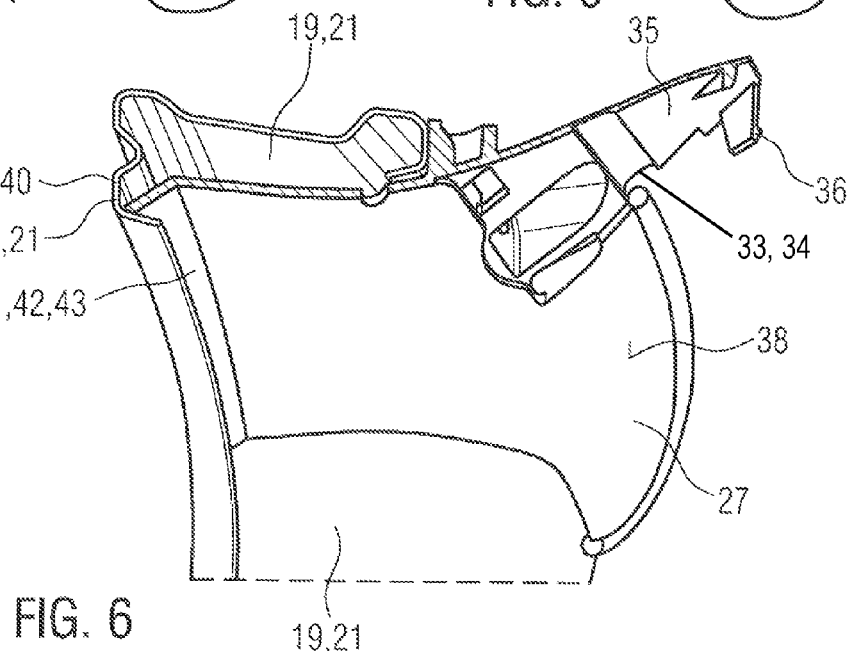
FIG. 6 is a partial view of the support structure with lateral support part fastened thereto.
Figure 7:
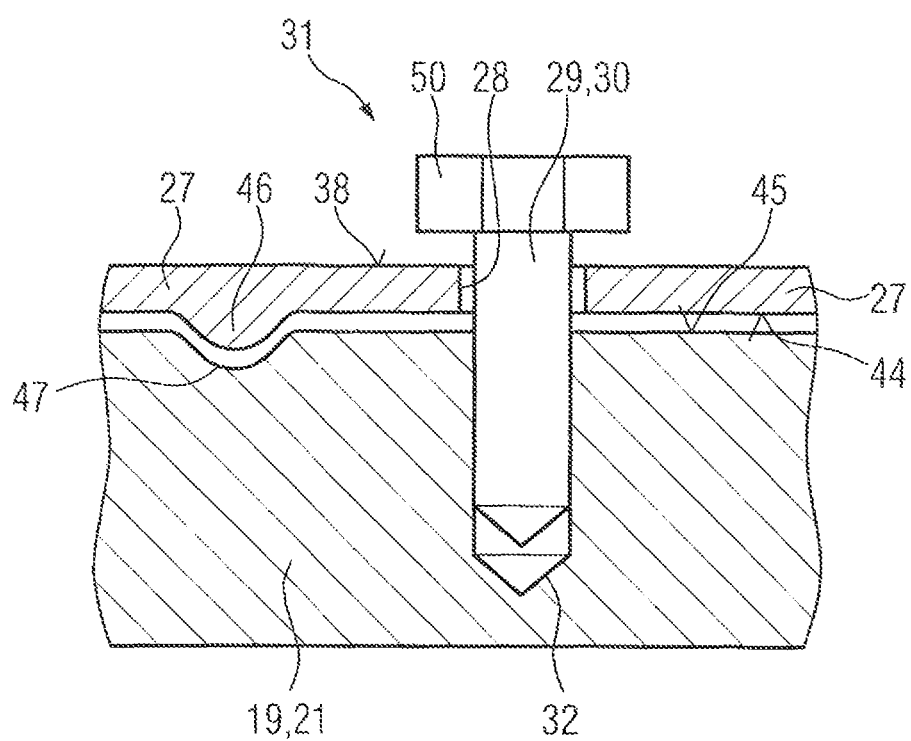
FIG. 7 is a partial view through the lateral support part, the support structure and a fastening element as a screw with which the lateral support part is fastened to the support structure.

Before placing the mounting surface 44 onto the counter-mounting surface 45, the strip 43 as the projection 41 is introduced into the groove 40 on the vertical strut 21, so that the strip 43 is arranged inside the groove 40 of the vertical strut 21 as a result. When the mounting surface 44 is subsequently placed on the counter-mounting surface 45 on the vertical strut 21, two mounting holes 28 on the lateral support part 27 align with two screw holes 32 (FIG. 7) on the vertical strut 21. While the lateral support part 27 rests on the strut 21, the cover plate 35 is in the open pivot position according to the depiction on FIG. 4, on that the two mounting holes 28 on the lateral support part 27 can be accessed from outside as a result. A respective screw 30 as a fastening element 29 can then be passed through the mounting holes 28 and introduced into the mounting holes 28, and also into the screw holes 32. The screw hole 28 includes a female thread, as a result of which a male thread on the screws 30 can be screwed into the female thread on the screw hole 32, and hence on the vertical strut 21. Screwing in takes place until such time as the screw head 31 exerts a compressive force on the lateral support part 27, so that the lateral support part 27 with the mounting surface 44 thereby rests on the counter-mounting surface 45 under a compressive force.

Given the complimentary mounting surface 44 on the lateral support part 27 relative to the counter-mounting surface 45 on the vertical strut 21, this not only yields a non-positive bond between the mounting surface 44 and counter-mounting surface 45 due to the compressive forced acting between the mounting surface 44 and counter-mounting surface 45, but rather also a positive bond. After the screws 30 have been tightened by applying a torque to the screw head 31, the cover plate 35 is pivoted into the closed pivot position shown on FIG. 5. As a result, the screws 30 are covered by the cover flap 35. The cover flap 35 includes detents 36, which latch into the latching recesses 37 in the closed pivot position of the cover flap 35. As a result, the cover flap 35 is reliably fastened in the closed pivot position after assembly.

The lateral support part 27 is further provided with two fastening geometries 48, specifically a respective two blind holes 49. The fastening geometries 48 are used to fasten a lateral support airbag (not shown). The optional lateral support airbag on each respective lateral support part 27 can be inflated with a compressor or air pump (not shown), or air can be released from the lateral support airbag, so that the lateral support for individuals on the seat 6 can thereby be modified and/or optimized, in particular tailored to different individuals on the seat 6. The extension of the lateral support part 27 in a horizontal longitudinal direction of the motor vehicle 1 following assembly measures approximately 30% of the extension 22 of the vertical strut 21 than the support structure 19 at the location where the lateral support part 27 is fastened to the support structure 19.

Viewed as a whole, significant advantages are associated with the seat 6 according to the present disclosure and the motor vehicle 1 according to the present disclosure. The lateral support part 27 is easily and inexpensively manufactured via injection molding in a single piece out of thermoplastic material. The lateral support part 2 is fastened to the vertical struts 21 positively and non-positively, thereby eliminating the need for a complicated welded joint. As a result, the lateral support parts 27 can be fastened to the support structure 19 only during an end phase of the process for manufacturing the seats 6. When manufacturing seats with and without lateral support parts 27, this makes it possible to significantly reduce warehousing, thereby significantly reducing the costs for manufacturing the seats 6.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A seat for a motor vehicle comprising:
a seat bottom having with a first seat cover, a first upholstery and a first support structure;
a seat back with a second seat cover, a second upholstery and a second support structure;
two lateral support members, each support member fastened to a front section of the second support structure configured to increase the lateral support of an occupant on the seat; and
a cover disposed on the lateral support structure and having a flap configured to pivot around a swivel axis of a hinge, wherein the fastening elements are covered by the cover flap in a closed pivot position,
wherein the lateral support members fastened to the support structure of the seat back.

2. The seat according to claim 1, wherein the lateral support members comprise plastic lateral support members, and the second support structure to which the lateral support members are fastened comprises a metal support structure, wherein the plastic lateral support members are detachably joined with the metal support structure.

3. The seat according to claim 1, wherein each of the lateral support members comprise a plate-shaped member.

4. The seat according to claim 1, wherein each of the lateral support members have at least one mounting hole formed therein, and a fastening element received in the at least one mounting hole and fixed on the second support structure for securing the lateral support members to the second support structure of the seat back.

5. The seat according to claim 1, wherein the hinge comprises a living hinge formed between the flap and the lateral support structure.

6. The seat according to claim 1, wherein the flap in the closed pivot position at least partially forms the support surface.

7. The seat according to claim 1, wherein each of the lateral support members comprise a support surface for at least one of the second upholstery and the second seat cover.

8. The seat according to claim 1, further comprising a recess formed on the second support structure for each respective lateral support member, and an end section of the lateral support part arranged in the recess so that each respective lateral support member is positively fastened in the recess of the second support structure.

9. The seat according to claim 8, wherein the recess comprises a groove and the end section comprises a strip.

10. The seat according to claim 1, further comprising a recess formed on the second support structure for each respective lateral support member, and a projection arranged in the recess so that each respective lateral support member is positively fastened in the recess of the second support structure.

11. The seat according to claim 10, wherein the recess comprises a groove and the projection comprises a strip.

12. The seat according to claim 1, wherein each of the lateral support members comprise a mounting surface lies on and is at least partially complementary to a respective counter-mounting surface of the second support structure.

13. The seat according to claim 1, wherein each of the lateral support members comprise a fastening geometry in the form of a blind hole or a clearance hole for affixing an inflatable lateral support airbag.

14. The seat according to claim 1, wherein the second support structure comprises two essentially vertically aligned struts and an essentially horizontally aligned strut, wherein lateral support member is fastened to each of the essentially vertically aligned struts.

15. The seat according to claim 1, wherein the lateral support members provide an extension in a horizontal longitudinal direction of the motor vehicle which measures in a range of 10% to 70% of an extension of the second support structure of the seat back with the lateral support member.

16. A motor vehicle comprising: a body, a drivetrain, and at least one seat according to claim 1 arranged in an interior occupant compartment defined by the body.

* * * * *